US012401286B2

(12) United States Patent
Liu

(10) Patent No.: US 12,401,286 B2
(45) Date of Patent: Aug. 26, 2025

(54) STARTUP CIRCUIT FOR A FLYBACK CONVERTER

(71) Applicant: TEXAS INSTRUMENTS INCORPORATED, Dallas, TX (US)

(72) Inventor: Pei-Hsin Liu, Bedford, NH (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 155 days.

(21) Appl. No.: 18/177,688

(22) Filed: Mar. 2, 2023

(65) Prior Publication Data

US 2023/0291316 A1    Sep. 14, 2023

Related U.S. Application Data

(60) Provisional application No. 63/318,038, filed on Mar. 9, 2022.

(51) Int. Cl.
  *H02M 3/335*    (2006.01)
  *H02M 1/36*    (2007.01)

(52) U.S. Cl.
  CPC ......... *H02M 3/33515* (2013.01); *H02M 1/36* (2013.01); *H02M 3/33523* (2013.01)

(58) Field of Classification Search
  CPC ............... H02M 3/33515; H02M 1/36; H02M 3/33523; H02M 1/342
  See application file for complete search history.

(56) References Cited

U.S. PATENT DOCUMENTS

| 5,180,964 A * | 1/1993 | Ewing ................... H02M 3/156 323/222 |
| 10,886,846 B2 | 1/2021 | Liu et al. |
| 11,509,230 B2 * | 11/2022 | Picard ............... H02M 3/33592 |
| 2017/0025963 A1 * | 1/2017 | Otake ............... H02M 3/33571 |

OTHER PUBLICATIONS

Extending the Supply Voltage of a 600V Input, No-Optocoupler Isolated Flyback Controller to 800V or Higher, Analog Devices, Yuchen Yang and William Xiong, 1995.

(Continued)

*Primary Examiner* — Adolf D Berhane
*Assistant Examiner* — Afework S Demisse
(74) *Attorney, Agent, or Firm* — Charles F. Koch; Frank D. Cimino

(57) ABSTRACT

A converter includes a power stage to provide a current through a primary winding of a transformer in response to a PWM signal and to induce a current in a secondary winding of the transformer to generate an output voltage. The power stage has a switching terminal. The converter also includes a controller, a clamp circuit, and an impedance device. The controller includes a first transistor coupled with a second transistor to initiate an operational voltage during a startup mode and to provide a control voltage based on an amplitude of a switching voltage at the switching terminal during a switching mode. The clamp circuit couples between the control input of the first transistor and a reference terminal and clamps a voltage at the first control input responsive to the switching voltage exceeding a clamp voltage. The impedance device couples between the switching terminal and the clamp circuit.

20 Claims, 6 Drawing Sheets

(56) References Cited

OTHER PUBLICATIONS

Automotive 4-V to 1-kV Input Flyback Reference Design Supporting Regenerative Braking Test, Texas Instruments, Feb. 2018.
User's Guide: Using the UCC28C56EVM-066 High-Density 40-W Auxiliary Power Supply for 800-V Traction Inverters, Texas Instruments, Jun. 2022.
International Search Report dated Jun. 5, 2023.
Texas Instruments Incorporated, "UCC28780 High Frequency Active Clamp Flyback Controller," Feb. 28, 2018.

* cited by examiner

STARTUP CIRCUIT FOR A FLYBACK CONVERTER

CROSS-REFERENCE TO RELATED APPLICATIONS

This application claims priority to U.S. Provisional Application No. 63/318,038, filed Mar. 9, 2022, which is hereby incorporated by reference.

BACKGROUND

Power converters can be implemented in a variety of ways. One type of power converter is a flyback converter. Like most switching converters, a flyback converter includes a controller that implements pulse width modulation (PWM) of a transistor coupled to the primary winding of a transformer. The output voltage from a flyback converter is derived from the secondary winding of the transformer. An auxiliary voltage also derived from the secondary side of the transformer (via an auxiliary winding) provides the operating voltage to the controller. Most, if not all, flyback converters include a start-up circuit to provide the operating voltage to the controller from the input voltage of the flyback converter until the controller is then able to begin the PWM switching cycles of the transistor. At that point, the start-up circuit is deactivated, and the controller continues operating based on the auxiliary voltage derived from the secondary side of the transformer. Some flyback converters also implement switch node sensing via a switch node sensing circuit to help reduce switching losses associated with the transistor that is controlled by the controller. The start-up circuit and switch node sensing circuits are separate circuits. Another trend for flyback converters is that the input voltage to the converter is being pushed to higher and higher levels. In some examples, the input voltage may be in the range of 1000 V, or even higher. Such high input voltages can represent a design challenge for flyback converters.

SUMMARY

In one example, a power converter includes a power stage to provide a current through a primary winding of a transformer in response to a PWM signal and to induce a current in a secondary winding of the transformer to generate an output voltage. The power stage has a switching terminal. The power converter also includes a controller, a clamp circuit, and an impedance device. The controller includes a first transistor coupled with a second transistor to initiate an operational voltage during a startup mode and to provide a control voltage based on an amplitude of a switching voltage at the switching terminal during a switching mode. The clamp circuit couples between the control input of the first transistor and a reference terminal and clamps a voltage at the first control input responsive to the switching voltage exceeding a clamp voltage. The impedance device couples between the switching terminal and the clamp circuit.

DETAILED DESCRIPTION

Figure 1:
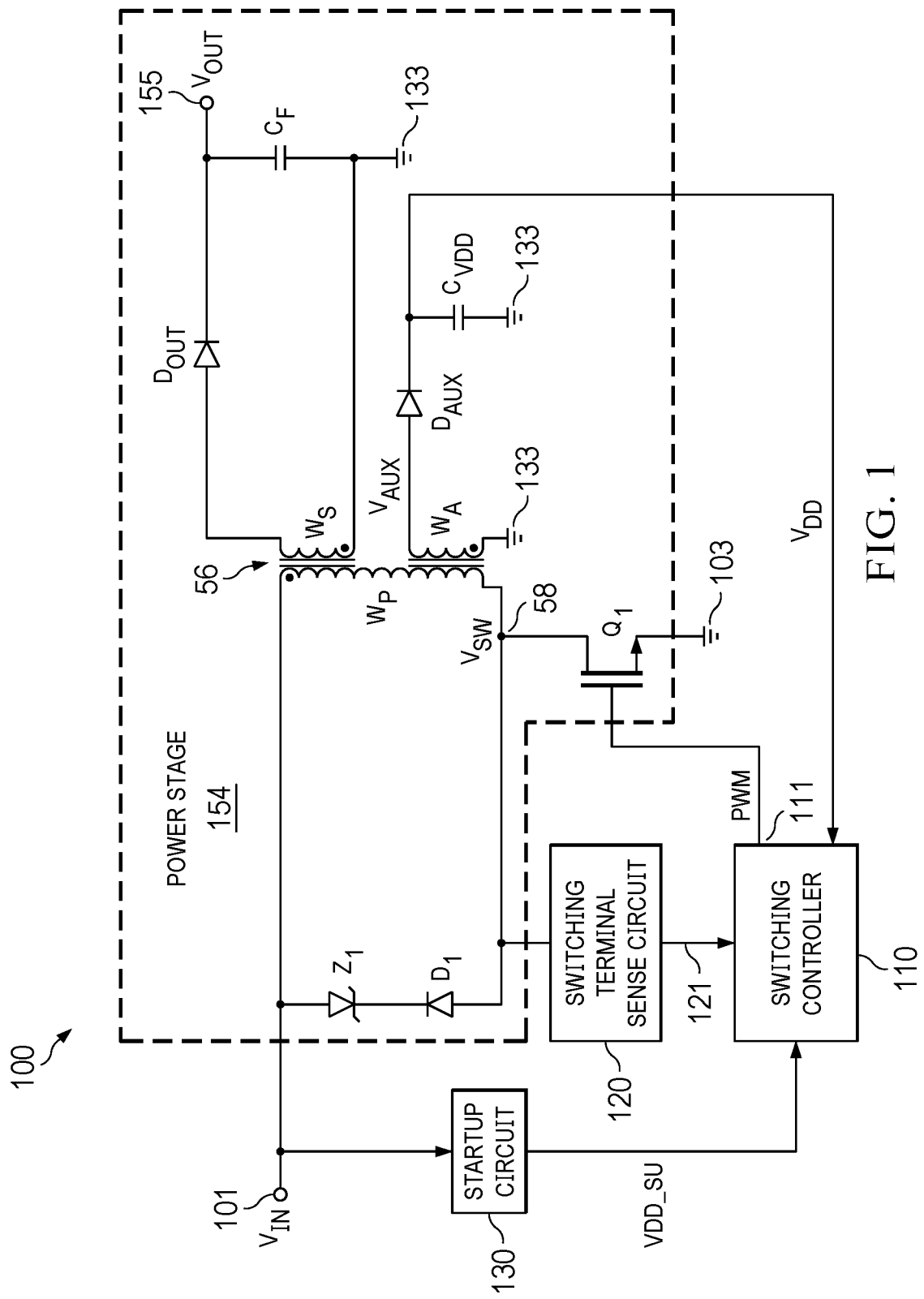
FIG. 1 is a schematic diagram of an example power converter having separate startup and switching terminal sense circuits.

The same reference numbers or other reference designators are used in the drawings to designate the same or similar (either by function and/or structure) features.

This disclosure generally relates to a power converter with switching control. The power converter generates an output voltage in response to an input voltage. As an example, the power converter can be configured as a flyback power converter. The power converter includes a gate driver stage that generates one or more switching signals in response to a respective one or more pulse-width modulation (PWM) signals. In one example, the gate driver generates a first switching signal in response to a first PWM signal and a second switching signal in response to a second PWM signal. The power converter also may include a power stage. The power stage includes a transformer and a first switch (e.g., transistor) controlled by the switching signal(s) (e.g., first and second switching signals). As an example, the first switch can be activated via the first switching signal to provide a primary current through a primary winding of the transformer, such as from an input voltage to a reference terminal (e.g., ground). The primary current in the primary winding may induce a secondary current in a secondary winding of the transformer. A rectifier may be coupled to the secondary winding to rectify the voltage of the secondary winding to thereby generate an output voltage. A second switch in the power stage may be activated via the second switching signal to circulate a magnetizing current associated with the transformer in a circuit path that includes an LC resonator.

In addition, the power converter may include a controller that generates the PWM signal(s) based on a feedback signal from the power stage. In one example, the controller includes a comparator that is configured to generate the PWM signal in response to a comparison of the amplitude of a control voltage and a predetermined switching threshold voltage. Furthermore, the power converter may include multiple control transistors that are coupled in series and to a switching terminal within the power stage. The multiple control transistors are usable to initiate an operational voltage for the switching controller during a startup mode. A startup mode is the state of the power converter in which the input voltage is increasing from 0V towards its steady state level (e.g., 800V, 1000V, etc.) and before the switching controller begins implementing PWM switching cycles within the power stage. In some examples, the multiple control transistors are also used to implement switching terminal voltage sensing. The controller provides the control voltage based on an amplitude of the switching voltage that is associated with the switching terminal. In one example, the predetermined switching threshold voltage has a low amplitude (e.g., less than 1 volt), such that the comparison provides the PWM signal to implement an approximately zero-volt switching (ZVS) of the first switch to reduce switching losses associated with the first switch. Accordingly, in some examples the multiple control transistors are usable to provide (a) a startup operational voltage for the switching controller and, for flyback converters that need switching terminal sensing, (b) a switching terminal sensing function (e.g., zero-voltage switching of the first switch).

FIG. 1 is a schematic diagram of an example power converter 100. In this example, power converter 100 is a flyback converter. An input voltage $V_{IN}$ is provided at the input terminal 101 of the power converter, and the power converter produces an output voltage $V_{OUT}$ at the output terminal 155. Power converter 100 includes a power stage 154, a switching controller 110, a switching terminal sense circuit 120, and a startup circuit 130. The power stage includes a transformer 56, a transistor $Q_1$, diodes $D_1$, $Z_1$ ($Z_1$ is a Zener diode), $D_{OUT}$, and $D_{AUX}$, capacitors $C_F$, and $C_{VDD}$. Transformer 56 includes a primary winding $W_P$, a secondary winding $W_S$, and an auxiliary winding $W_A$. In this example, transistor $Q_1$ is an n-channel field effect transistor (NFET) and is coupled between one terminal of the primary winding $W_P$ and a reference terminal 103 (e.g., ground). The switching controller 110 has an output 111 coupled to the gate of transistor $Q_1$. The switching controller 110 produces a control signal, PWM, at its output 111 to control the ON and OFF state of transistor $Q_1$ in accordance with the target duty cycle of the PWM control signal.

The drain of transistor $Q_1$ is coupled to the primary winding $W_P$ at a switching terminal 58. The voltage on the switching terminal 58 is switching voltage $V_{SW}$. The switching terminal 58 is also coupled to the switching terminal sense circuit 120. Based on the switching voltage $V_{SW}$ on the switching terminal 58, the switching terminal sense circuit 120 generates a control signal 121 to the switching controller 110 to indicate when the voltage $V_{SW}$ is close to or equal to 0V. The switching controller 110 thus can determine when the switching voltage $V_{SW}$ is below a threshold (e.g., close to or equal to the voltage of the reference terminal 103) so that the controller can activate (turn ON) transistor $Q_1$ when the drain-to-source voltage (Vds) of transistor $Q_1$ is close to or equal to V thereby reducing switching losses associated with transistor $Q_1$.

The anode of diode $D_{OUT}$ is coupled to the secondary winding $W_S$. Capacitor $C_F$ is coupled between the cathode of diode $D_{OUT}$ and the secondary side's reference terminal 133. Diode $D_{OUT}$ rectifies the voltage from the secondary winding $W_S$ to produce an output voltage $V_{OUT}$ on the power converter's output terminal 155. The anode of diode $D_{AUX}$ is coupled to the auxiliary winding $W_A$. Capacitor $C_{VDD}$ is coupled between the cathode of diode $D_{AUX}$ and the secondary side's reference terminal 133. Diode $D_{AUX}$ rectifies the voltage from the auxiliary winding $W_A$ to produce a voltage $V_{DD}$, which is provided to the switching controller 110 as its operating voltage during the normal operating mode. The normal operating mode refers to the mode in which the switching controller 110 is powered on controlling the ON and OFF state of transistor Q1 in accordance with the PWM switching cycles of the PWM signal.

Voltages $V_{OUT}$ and $V_{DD}$ are only available if the switching controller 110 is powered on and thus able to produce the PWM control signal to the gate of transistor $Q_1$ to thereby generate the switching voltage $V_{SW}$ to transfer energy through the transformer 56. The startup circuit 130 is coupled between the input terminal 101 and switching controller 110. During startup of the power converter 100, the startup circuit provides a voltage VDD_SU to power on the controller 110. Once the switching controller 110 is powered on with the help of the startup circuit 130, the switching controller 110 can begin providing the PWM control signal to the gate of transistor $Q_1$ to cause energy transfer through the transformer 56. The energy transferred through the transformer 56 can be used to produce the output voltage $V_{OUT}$ and the operating voltage $V_{DD}$ for the switching controller 110. The startup circuit 130 then can be deactivated.

The startup circuit 130 is a separate circuit from the switching terminal sense circuit 120. These two separate circuits unfortunately occupy considerable area on a semiconductor die on which the power converter 100 is fabricated.

Figure 2:
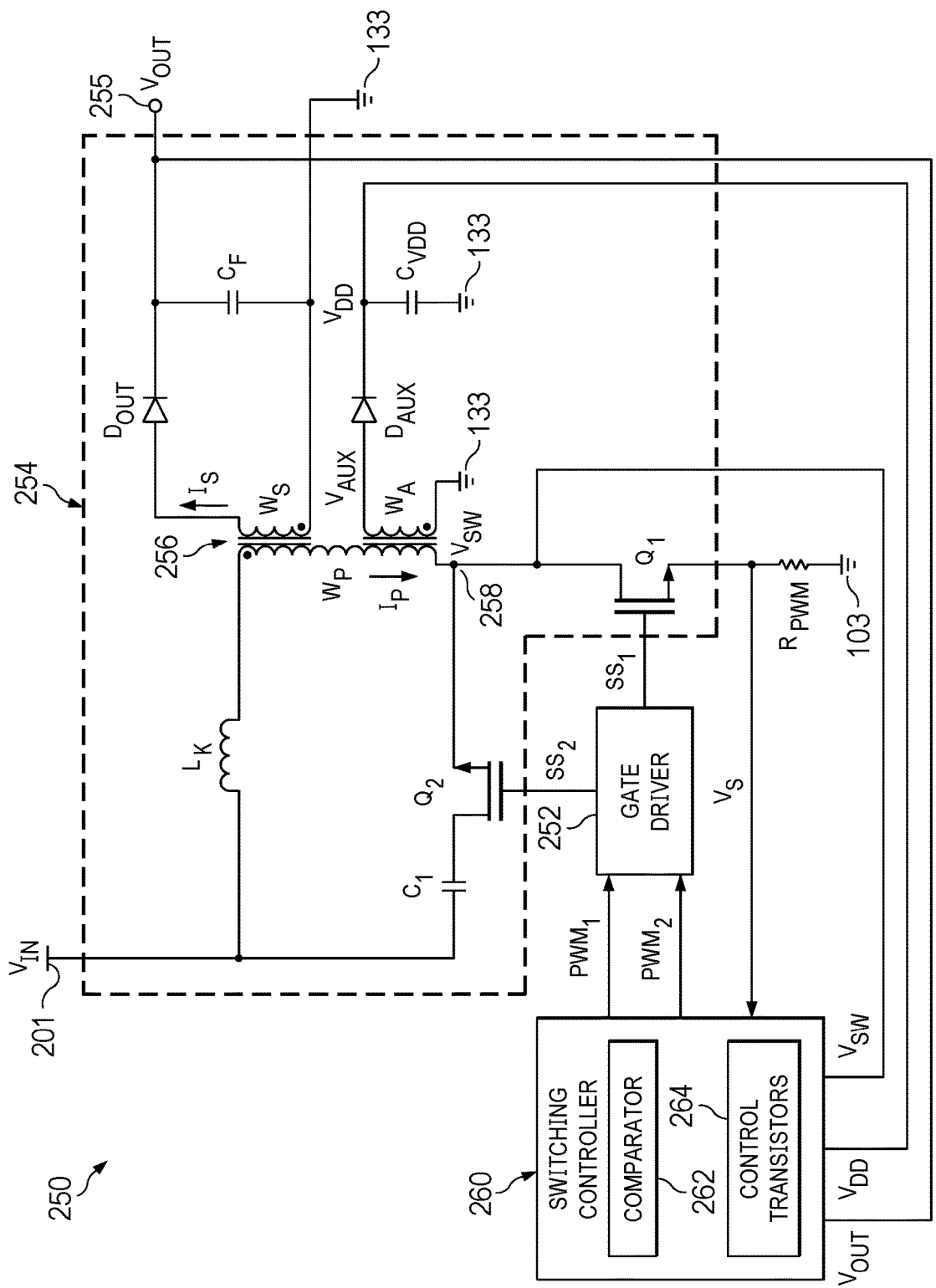
FIG. 2 is a schematic diagram of an example power converter having a circuit that implements both the startup and switching terminal sense functions with multiple transistors to accommodate higher levels of an input voltage.

FIG. 2 illustrates an example of a power converter circuit 250, which addresses one or more of the problems described above. The power converter circuit 250 converts a DC input voltage $V_{IN}$ (e.g., a rectified AC input voltage) at an input terminal 201 to a DC output voltage $V_{OUT}$ at an output terminal 255. Some or all the components of the power converter circuit 250 can be implemented in any of a variety of ways, such as on an integrated circuit (IC). In the example of FIG. 2, the power converter circuit 250 includes a gate driver 252, a power stage 254, and a switching controller 260. The power stage 254 includes a transformer 256 having a primary winding $W_P$, a secondary winding $W_S$, and an auxiliary winding $W_A$. The power stage 254 also includes an input inductor $L_K$ corresponding to a leakage inductance of the transformer 256, a resonant capacitor $C_1$, and a pair of switches shown in the example of FIG. 2 as transistors $Q_1$ and $Q_2$. In this example, transistors $Q_1$ and $Q_2$ are NFETs. The source of transistor $Q_2$ is coupled to the drain of transistor $Q_1$ and to the primary winding $W_P$ at a switching terminal 258. The voltage on the switching terminal 258 is switching voltage $V_{SW}$. The anode of diode $D_{OUT}$ is coupled to the secondary winding. Capacitor $C_F$ is coupled between the cathode of diode $D_{OUT}$ and the reference terminal 133. The voltage across capacitor $C_F$ is the output voltage $V_{OUT}$ from the power converter circuit 250. The anode of the diode $D_{AUX}$ is coupled to the auxiliary winding $W_A$, and capacitor $C_{VDD}$ is coupled between the cathode of diode $D_{AUX}$ and the reference terminal 133. The voltage across capacitor $C_{VDD}$ is voltage $V_{DD}$ and is provided to the switching controller 260 for its operating voltage during the normal operating mode.

The switching controller 260 includes a comparator 262 and multiple control transistors 264. The switching controller 260 is coupled to the output terminal 255, the capacitor $C_{VDD}$, and the switching terminal 258. The switching controller produces the signals $PWM_1$ and $PWM_2$ to inputs of the gate driver 252. Outputs of the gate driver 252 are coupled to the gates of transistors $Q_1$ and $Q_2$ and provide switching signals $SS_1$ and $SS_2$ to the respective gates of transistors $Q_1$ and $Q_2$, as shown. Accordingly, transistor $Q_1$ is controlled via the switching signal $SS_1$, and transistor $Q_2$ is controlled via the switching signal $SS_2$.

The power converter circuit 250 implements repeating PWM switching cycles. Each switching cycle includes at least a first switching phase and a second switching phase. During the first switching phase, the switching controller 260 causes transistor $Q_1$ to activate (turn ON) into the saturation region via the first switching signal $SS_1$ to cause a primary current $I_P$ to flow from the input terminal 201 ($V_{IN}$) through the input inductor $L_K$, the primary winding $W_P$, and transistor $Q_1$ to the reference terminal 103. In response to the primary current $I_P$ in the primary winding $W_P$, a secondary current Is is induced in the secondary winding $W_S$ and flows through diode $D_{OUT}$ to generate the output voltage $V_{OUT}$ across a load (not shown) and capacitor $C_F$.

Upon deactivation of transistor $Q_1$ via the first switching signal $SS_1$, and after a short pre-determined dead-time, during a second switching phase, the switching controller 260 causes transistor $Q_2$ to activate via the gate driver's switching signal $SS_2$ to, along with the secondary winding $W_S$, output voltage $V_{OUT}$, and diode $D_{OUT}$, cause a magnetizing current, which is a component of the primary winding current $I_P$, to decay to zero amperes, and then to reverse direction by the voltage of the resonant capacitor $C_1$. The negative magnetizing current, following the deactivation of transistor $Q_2$, discharges the junction capacitance of transistor $Q_1$ and charges the junction capacitance of transistor $Q_2$. As the charge of transistor $Q_1$ is removed, the Vds of transistor $Q_1$ reduces to approximately zero volts before the switching controller 260 again activates transistor $Q_1$. As described above, activating transistor $Q_1$ when its drain-to-source voltage is approximately zero volts is referred to as zero voltage switching (ZVS). As a result of the switching controller 260 implementing ZVS, which is useful by, for example, active clamp flyback and ZVS flyback converters, the power converter circuit 250 has relatively low switching losses associated with transistor $Q_1$. During the activation time of transistor $Q_2$, the leakage inductance $L_K$ and the capacitor $C_1$ form the aforementioned LC resonant tank to circulate the leakage inductance $L_K$ energy to the output, such that clamping losses can also be efficiently reduced.

The magnitude of voltage $V_{OUT}$ is, in part, a function of the turns-ratio between the primary winding $W_P$ and the secondary winding $W_S$. Similarly, the amplitude of voltage $V_{AUX}$ across the auxiliary winding $W_A$ is, in part, a function of the turns-ratio between the primary winding $W_P$ and the auxiliary winding $W_A$. The controller's operational voltage $V_{DD}$ corresponds to the auxiliary voltage $V_{AUX}$ associated with the auxiliary winding $W_A$ ($V_{DD}$ is $V_{AUX}$ less the forward bias voltage drop associated with diode $D_{AUX}$).

In some examples, the multiple control transistors 264 associated with the switching controller 260 include two transistors. In other examples, the multiple control transistors 264 include three (or more) transistors. The multiple control transistors 264 may be depletion-mode transistors that generate a switching control voltage in response to the switching voltage $V_{SW}$. The comparator 262 asserts the signal $PWM_2$ based on a comparison of the switching control voltage $V_{SW}$ and a predetermined switching threshold voltage. As an example, the power converter circuit 250 implements zero-voltage switching of transistor $Q_1$, to thereby activate transistor $Q_1$ at approximately zero volts amplitude of the switching voltage $V_{SW}$ at the switching node 258. In addition, the multiple control transistors 264 may provide a startup voltage for the switching controller 260 at initiation of the power converter circuit 250.

Figure 3:
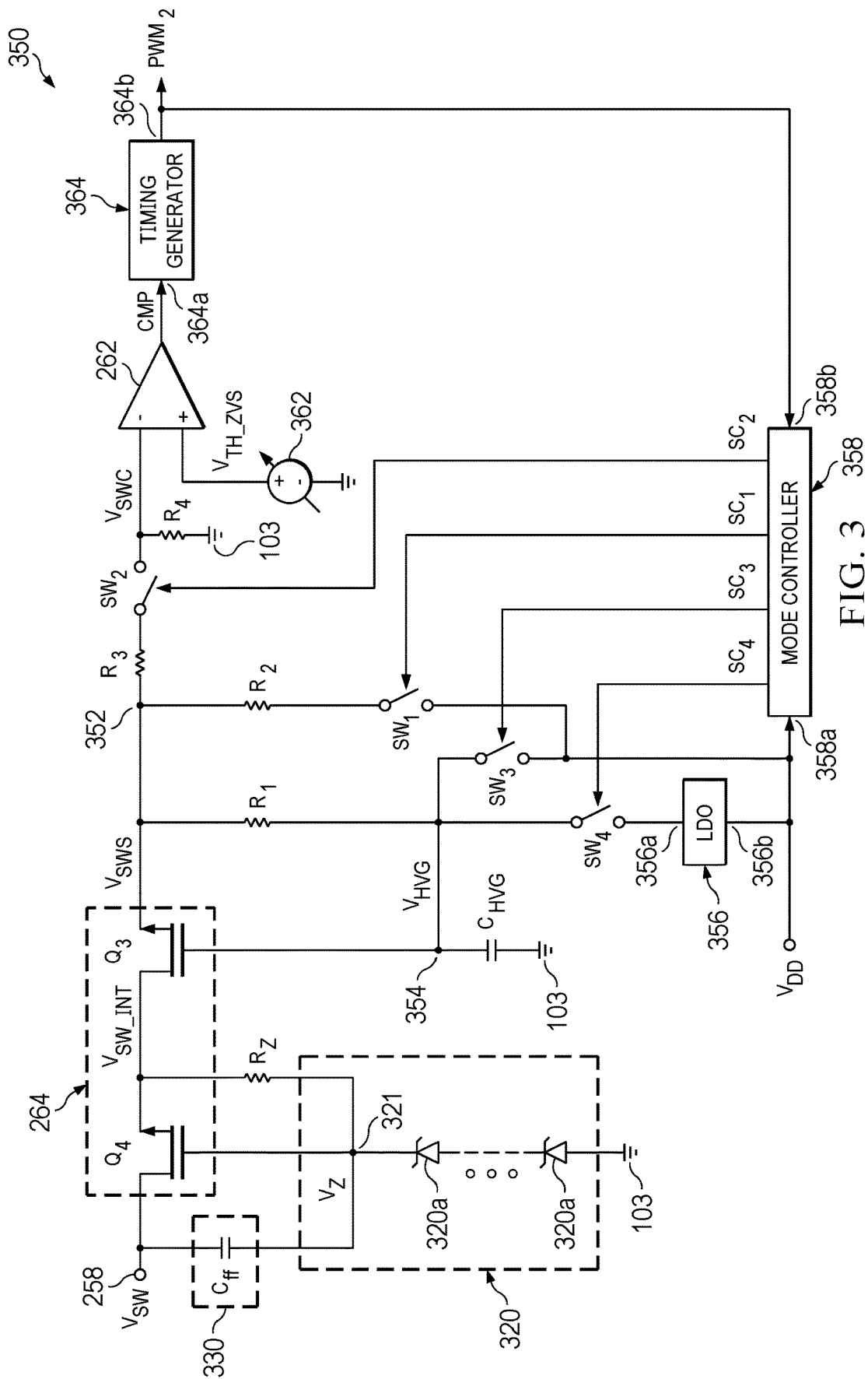
FIG. 3 is a schematic diagram of a switching controller usable within the power converter of FIG. 2, in an example.

FIG. 3 is a schematic diagram of an example switching controller 350 usable to implement the switching controller 260 of FIG. 2. In the example of FIG. 3, switching controller 350 includes a voltage regulator 356 (e.g., a low-dropout (LDO) voltage regulator), a mode controller 358, comparator 262, a voltage source circuit 362 (which may be programmable or non-programmable), a timing generator 364, the multiple control transistors 264, a clamp circuit 320, an impedance device 330, capacitor $C_{HVG}$, resistors $R_1$, $R2$, $R_3$, and $R_Z$, and switches $SW_1$, $SW_2$, $SW_3$, and $SW_4$. Each switch $SW_1$-$SW_4$ may be implemented as a separate transistor. In this example, the multiple control transistors 264 include two transistors $Q_3$ and $Q_4$ coupled in series. Each of the transistors $Q_3$ and $Q_4$ may be a depletion-mode transistor (e.g., an n-channel depletion-mode transistor). A depletion-mode transistor is normally ON and is turned OFF by application of a gate voltage that is at least the threshold voltage below its source voltage. Accordingly, a depletion-mode transistor is ON with a Vgs equal to 0V. The drain of the transistor $Q_4$ is coupled to the switching terminal 258. The impedance device is coupled between the switching terminal 258 and the gate of the control transistor $Q_4$. The clamp circuit 320 is coupled between the gate of transistor $Q_4$ and the reference terminal 103. Resistor $R_Z$ is coupled between the source of transistor $Q_4$ (and drain of transistor $Q_3$) and the gate of control transistor Q4.

Capacitor $C_{HVG}$ is coupled between the gate of transistor $Q_3$ and the reference terminal 103. Resistor $R_1$ is coupled between the source of transistor $Q_3$ and capacitor $C_{HVG}$. One terminal of switch $SW_4$ is coupled to resistor $R_1$ and to capacitor $C_{HVG}$. The other terminal of switch $SW_4$ is coupled to an output terminal 356a of the voltage regulator 356. The cathode of diode $D_{AUX}$ (FIG. 2) is coupled to an input terminal 356b of the voltage regulator 356 and to a power input terminal 358a of the mode controller 358. Accordingly, the power input terminal 358a of the mode controller 358 and the input terminal 356b of the voltage regulator 356 receives operational voltage $V_{DD}$ from the auxiliary winding $W_A$ of transformer 256 during the normal operating mode of the power converter 250. Switch SW3 is coupled between the upper terminal of capacitor $C_{HVG}$ (coupled to the gate of transistor Q3) and the power input terminal 358 of the mode controller 358.

Resistor $R_3$ is coupled between the source of transistor $Q_3$ and a terminal of switch $SW_2$, with the other terminal of switch $SW_2$ coupled to the negative (−) input of comparator 262. The voltage on the source of transistor Q3 is voltage $V_{SWS}$, and the voltage on the negative input of comparator 262 is a voltage $V_{SWC}$. Resistor $R_4$ is coupled between the negative input of comparator 262 and the reference terminal 103. Resistor $R_2$ is coupled between the source of transistor $Q_3$ and a terminal of switch $SW_1$, with the other terminal of switch $SW_1$ coupled to the power input terminal 358a of the mode controller 358.

The voltage source circuit 362 is coupled to the positive (+) input of comparator 262. The voltage source circuit 362 may be programmable (as indicated) or non-programmable and produces a voltage $V_{TH\_ZVS}$. The output of comparator 262 is coupled to an input 364a of the timing generator 364. The output 364b of the timing generator 364 provides the signal $PWM_2$ and is coupled to an input 358b of the mode controller 358.

The mode controller 358 may be implemented as a finite state machine including logic gates, flip-flops, registers, etc. The mode controller 358 produces output signals on outputs 358c, 358d, 358e, and 358f, which are coupled to control inputs of switches $SW_1$, $SW_2$, $SW_3$, and $SW_4$, respectively. The mode controller 358 produces signal $SC_1$, $SC_2$, $SC_3$, and $SC_4$ to the respective control inputs of switches $SW_1$, $SW_2$, $SW_3$, and $SW_4$. Through each signal $SC_1$-$SC_4$, the mode controller 358 can open (disable) or close (enable) each respective switch.

The clamp circuit 320 is coupled between the gate of transistor Q4 at a clamp terminal 321 and the reference terminal 103. In the example of FIG. 3, the clamp circuit 320 includes multiple Zener diodes 320a coupled in series between the clamp terminal 321 and the reference terminal 103. The number of Zener diodes and their breakdown voltages define the clamp voltage of the clamp circuit 320. The target clamp voltage of the clamp circuit 320 is application-specific and depends on, for example, the maximum possible magnitude of voltage $V_{SW}$. When the clamp circuit 320 is activated, the voltage on the clamp terminal 321 is a fixed voltage (the clamp voltage), which is the sum of the breakdown voltages of the multiple Zener diodes 320a of the clamp circuit 320. In one example, the clamp voltage on the clamp terminal 321 is approximately one-half of the maximum magnitude of voltage $V_{SW}$ during the normal operating mode. For example, if the maximum magnitude of voltage $V_{SW}$ during the normal operating mode is 1000V, then the clamp circuit 320 activates when the voltage $V_{SW}$ reaches approximately 500V. For a voltage $V_{SW}$ below the clamp voltage of the clamp circuit 320, the clamp circuit 320 is not activated, and the Vgs of transistor Q4 is approximately 0V due to the resistor coupled between the gate and the source of transistor Q4.

Figure 4:
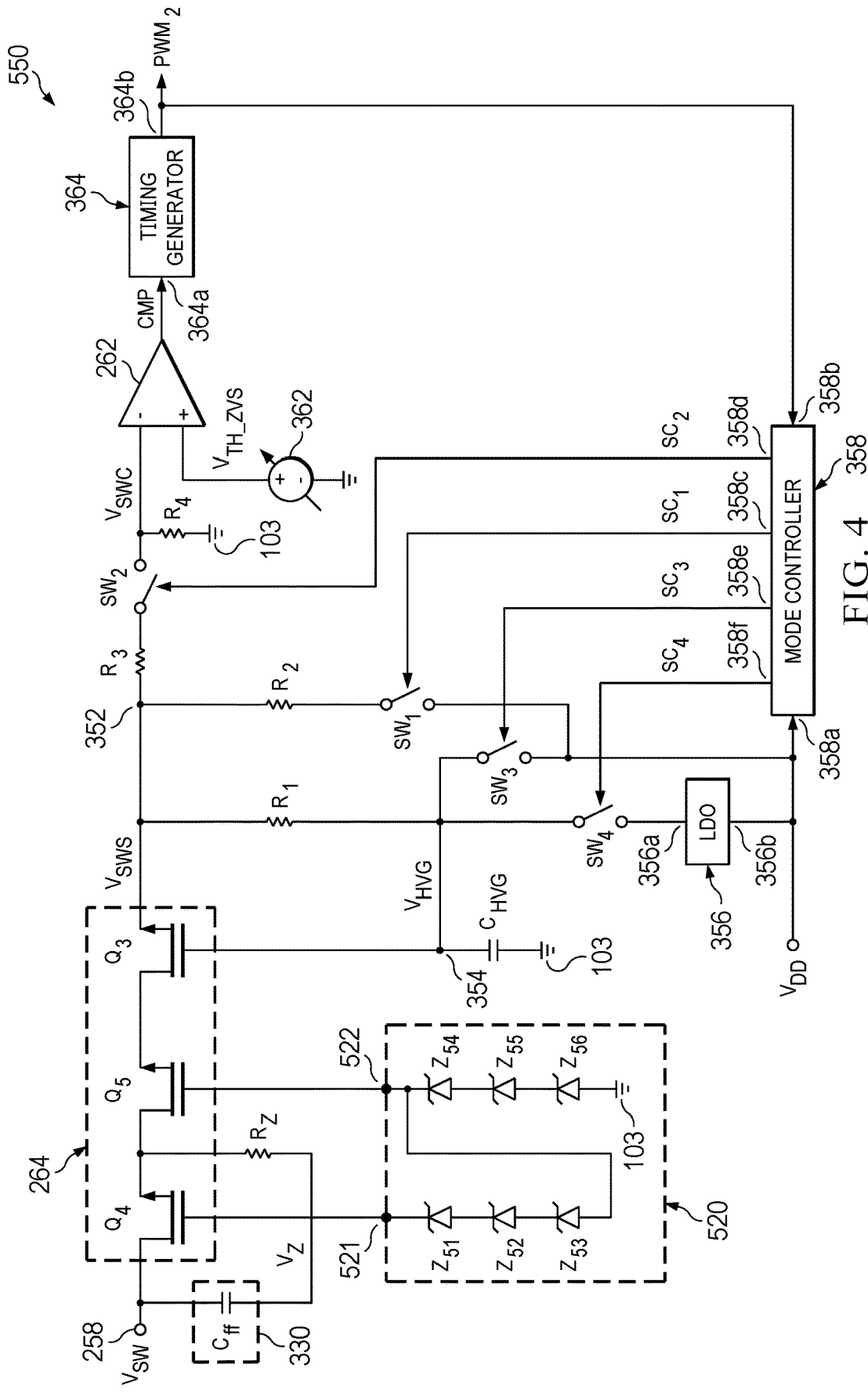
FIG. 4 is a schematic diagram of a switching controller usable within the power converter of FIG. 2, in another example.

In the example of FIG. 4, the impedance device 330 is a capacitor $C_{FF}$. The impedance device 330 may be implemented as multiple capacitors, for example, coupled in series and/or in parallel. In another example, the impedance device 330 includes a capacitor coupled in series with a resistor.

During the startup mode of the power converter, the switching controller 350 provides an operational voltage to the mode controller 358. During the power converter's normal mode of operation, the auxiliary winding $W_P$ provides the operating voltage $V_{DD}$ to the switching controller 350, and the switching controller 350 senses the voltage on the switching terminal 258 to implement ZVS of transistor Q1 (FIG. 2). That is, the switching controller 350 provides both startup and switching terminal sensing functionality.

During the startup mode of the power converter circuit 250, the operating voltage $V_{DD}$ from the auxiliary winding $W_A$ has an amplitude that is less than an under-voltage lock-out (UVLO) amplitude, which may have a predetermined amplitude that is stored in the mode controller 358. The mode controller 358 may compare the operational voltage $V_{DD}$ with the UVLO amplitude to determine whether the power converter circuit 250 is in the startup mode (e.g., $V_{DD}$ less than UVLO voltage) or the normal operating mode (e.g., $V_{DD}$ equal to or greater than the UVLO voltage). In response to determining that the operational voltage $V_{DD}$ is less than the UVLO amplitude (e.g., a first UVLO amplitude), the mode controller 358 determines that the power converter circuit 250 is in the startup mode, and thus, as further described below, circuitry within the switching controller 350 responds by building up a sufficient operating voltage for the mode controller 358 in order for the controller to be able to provide pulse-width modulated switching of the transistors $Q_1$ and $Q_2$. In response to determining that the power converter circuit 250 is in the startup mode, the mode controller 358 causes switches $SW_2$ and $SW_4$ to be deactivated (open) via the respective switch control signals $SC_2$ and $SC_4$ and causes switches $SW_1$ and $SW_3$ to be activated (e.g., closed) via the respective switch control signals $SC_1$ and $SC_3$.

In the startup mode, the power stage 254 receives the input voltage $V_{IN}$ which is increasing towards its steady state level (e.g., 1000V). With no PWM switching of transistors $Q_1$ and $Q_2$ (because mode controller 358 is not yet powered on), voltage $V_{SW}$ approximately equals the input voltage $V_{IN}$ minus a possible voltage drop across the primary winding $W_P$. As described previously, transistors $Q_3$ and $Q_4$ may be depletion-mode transistors and are in an activated state (ON) in response to approximately a zero amplitude Vgs. Accordingly, during the startup mode, transistors $Q_3$ and $Q_4$ are in the activated state. With transistors $Q_3$ and Q4 activated, transistors $Q_3$ and $Q_4$ collectively act as a current source during the startup mode to begin charging capacitors $C_{HVG}$ and $C_{VDD}$ via currents through resistor $R_1$ and through the closed switches $SW_1$ and $SW_3$.

As a result, the operational voltage $V_{DD}$ and the voltage $V_{HVG}$ begin to increase during the startup mode. Eventually, the operational voltage $V_{DD}$ reaches an amplitude that is approximately equal to the UVLO amplitude (e.g., a first UVLO amplitude). Up until that point, current through activated transistors $Q_3$ and $Q_4$ charged capacitors $C_{HVG}$ and $C_{VDD}$ to provide a bias voltage to power on the mode controller 358. In this way, the switching converter 350 provides a voltage startup functionality for the power converter 250.

In response to the operational voltage $V_{DD}$ reaching an amplitude that is approximately equal to the UVLO amplitude, the mode controller 358 switches to the normal operating mode. Upon entry into the normal operating mode, via the switch control signals $SC_1$ and $SC_3$, the mode controller 358 deactivates (opens) switches $SW_1$ and $SW_3$ and maintains the switches $SW_1$ and $SW_3$ in the deactivated state. Additionally, the mode controller 358 activates (closes) switch $SW_4$ to permit the regulated output voltage $V_{HVG}$ from voltage regulator 356 to be provided to the gate of transistor $Q_3$. With its gate voltage ($V_{HVG}$) at a fixed voltage controlled by the voltage regulator 356, transistor $Q_3$ deactivates when the source voltage at $Q_3$ is at a threshold voltage of $Q_3$ that is above the output voltage of the voltage regulator; otherwise, transistor $Q_3$ is activated. When the $V_{SW}$ voltage becomes large enough to activate the clamp circuit 320, the voltage on the gate of transistor $Q_4$ becomes fixed, and as its source voltage rises further, transistor $Q_4$ deactivates.

The mode controller 358 monitors the operational voltage $V_{DD}$ during the normal operating mode. Upon detecting that the operational voltage $V_{DD}$ becomes less than the UVLO amplitude (e.g., the controller 260 detects a fault condition of the power converter, or the $V_{DD}$ voltage from the rectified voltage of the auxiliary winding (WA) falls below UVLO due to abnormal output voltage drop), the mode controller 358 transitions the power converter circuit 250 back to the startup mode (e.g., by causing switches $SW_2$ and $SW_4$ to open and switches $SW_1$ and $SW_3$ to close). In one example, the mode controller 158 returns the power converter circuit 250 to the startup mode in response to the operational voltage $V_{DD}$ decreasing below a second UVLO amplitude that is less than the first UVLO amplitude corresponding to the threshold for the normal operating mode.

In the normal operating mode, as described previously, the switching controller 350 asserts the signal $PWM_2$ based on the amplitude of the voltage $V_{SWC}$ compared to the voltage $V_{TH\_ZVS}$ from the voltage source circuit 362. Following the deactivation of the transistor $Q_1$, the switching voltage $V_{SW}$ may have a relatively high amplitude. For example, when transistor Q1 deactivates, the amplitude of the voltage $V_{SW}$ may become approximately equal to the sum of $V_{in}$ (e.g., 1000V) and the voltage across the primary winding $W_P$. In response to the transistor $Q_2$ being deactivated, the switching terminal 258 can begin to resonantly transition downward, thus causing the switching voltage $V_{SW}$, and thus $V_{SWC}$, to decrease. Some power converters may implement ZVS of transistor $Q_1$ in which transistor $Q_1$ is activated (turned ON) at approximately a zero-volt amplitude of the switching voltage $V_{SW}$.

During the normal operating mode, the voltage $V_{SW}$ transitions from a lower voltage (e.g., the voltage of the reference terminal 103) to a higher voltage (e.g., input voltage $V_{IN}$ plus the voltage of the primary winding $W_P$). As described below, transistors $Q_3$ and $Q_4$ are disabled (OFF) at higher voltage levels of $V_{SW}$ and are enabled (ON) at lower voltage levels of $V_{SW}$. When transistors Q3 and Q4 are OFF, transistors Q3 and Q4 function as a voltage divider between voltage $V_{SW}$ and the voltage of the reference terminal 103. Accordingly, each transistor $Q_3$ and $Q_4$ advantageously need not be rated (e.g., the maximum permitted $V_{ds}$) for the full voltage amplitude of $V_{IN}$ (or input voltage $V_{IN}$ plus the voltage of the primary winding $W_P$), and thus can be smaller than transistors $Q_3$ or $Q_4$ would have been if they were rated for a $V_{ds}$ of 1000V. For example, in an application in which $V_{IN}$ is 1000V, each of transistors $Q_3$ and $Q_4$ may have a $V_{ds}$ rating of only 600V, and advantageously not be rated for 1000V $V_{ds}$.

The following discussion describes the operation of the switching controller 350 as the voltage $V_{SW}$ transitions from a lower voltage (when transistor $Q_1$ activates) to a higher voltage (when transistor $Q_1$ deactivates) and then back to the lower voltage. Starting from a lower level of voltage $V_{SW}$, the voltage $V_{SW}$ is below the clamp voltage (e.g., 500V) of the clamp circuit 320, and thus the clamp circuit 320 is not activated. Accordingly, current does not flow through the clamp circuit 320, and thus the gate and source of transistor $Q_4$ are at the same voltage (the Vgs of transistor $Q_4$ is 0V). With the Vgs of transistor at 0V, transistor $Q_4$ is in the activated state (ON). With transistor $Q_4$ activated, the voltage on the drain of transistor $Q_3$ is at the lower voltage, which is less than the threshold voltage of transistor $Q_3$ below voltage VHVG, and thus transistor $Q_3$ also is activated.

The mode controller 358 has activated switch $SW_2$ to permit the comparator 262 to compare voltage $V_{SWC}$ (which is approximately equal to voltage $V_{SW}$) to the threshold voltage $V_{TH\_ZVS}$ from the voltage source circuit 362. When voltage $V_{SWC}$ falls to voltage $V_{TH}$, the comparator forces its output signal CMP to a logic high state. A signal CMP logic high occurring within a defined dead time (from PWM2 falling edge to PWM1 rising edge) indicates that the current switching cycle can achieve zero voltage switching albeit with a relatively high negative magnetizing current. In response, the timing generator will slightly reduce the on-time of PWM2 at the next switching cycle to incrementally reduce the negative magnetizing current. On the other hand, the signal CMP not becoming logic high within the defined dead time indicates that the current switching cycle cannot achieve zero voltage switching. In response, the timing generator slightly increases the on-time of PWM2 at the next switching cycle to increase the negative magnetizing current for discharging the switching node voltage slightly more. The timing generator 364 may be or include a one-shot circuit with adjustable on-time based on the logic level status of the signal CMP. When the $PWM_1$ signal becomes logic low, transistor $Q_1$ turns off and the positive magnetizing current will charge the switch node 258, and switching voltage $V_{SW}$ rises. The signal $PWM_2$ becomes logic high after the dead time from $PWM_1$ falling edge. When the gate driver 252 (FIG. 2) responds to $PWM_2$ by activating transistor $Q_2$, the voltage $V_{SW}$ reaches its highest level. The mode controller 358 responds to the positive assertion of signal $PWM_2$ by deactivating switch $SW_2$ to effectively disable comparator 262 (which is not needed at this point during the switching cycle).

Eventually, voltage $V_{SW}$ rises to the clamp voltage of the voltage clamp circuit 320, and the clamp circuit activates. During $V_{SW}$ rising period, the fast dv/dt will create a charge current through the impedance device 330 (e.g., a capacitor), so the capacitor $C_{ff}$ allows the voltage on the clamp terminal 321 to simultaneously rise with $V_{SW}$ and activate the clamp circuit quickly. The activation of the clamp circuit 320 fixes (clamps) the voltage on the gate of transistor $Q_4$. Resistor $R_Z$ provides a current path from the source of transistor $Q_4$ to the Zener diode stack of the clamp circuit 320. Resistor $R_Z$ is sized to control the magnitude of current that flows in the Zener stack from the resistor. The magnitude of the current from resistor $R_Z$ is approximately equal to the leakage current within the Zener diodes 320a. By balancing the leakage current from the Zener diodes, resistor $R_Z$ helps to maintain the clamp circuit 320 in its activated state when the voltage $V_{SW}$ is above the clamp voltage of the clamp circuit. Because power is dissipated in the resistor $R_Z$, the impedance device 330 allows resistor $R_Z$ to have a relatively high resistance to overcome the Zener diode leakage current with negligible impact on converter efficiency. On the other hand, in an example that lacks the impedance device 330, resistor $R_Z$ should have a relatively low resistance value to activate the clamp circuit 320 quickly enough during a switch node rising edge, and the low resistance will consume more power which will reduce converter efficiency.

With the gate voltage of transistor $Q_4$ fixed due to the clamp circuit 320 being activated, as the voltage VSW continues to rise, the source voltage becomes more than the threshold voltage above the gate voltage of transistor $Q_4$. At this point, transistor $Q_4$ becomes deactivated. Meanwhile, transistor $Q_3$ also deactivates when its source voltage ($V_{SWS}$) becomes more than the threshold voltage above the gate voltage of transistor $Q_3$, which is fixed by the voltage regulator 356. At this point, both transistors $Q_3$ and $Q_4$ thereby protect the rest of the circuitry of the switching controller 350 as the voltage $V_{SW}$ continues to rise (e.g., up to 1000V). The series coupling of the drain-to-source capacitances of transistors $Q_3$ and $Q_4$ function as a voltage divider so that the Vds of each transistor is approximately one-half of the voltage $V_{SW}$.

When the one-shot pulse from the timing generator 364 expires, signal PWM2 becomes logic low followed (after the dead time) by signal PWM1 becoming logic high. During the dead time, the negative magnetizing current discharges the switch node voltage, so the voltage VSW becomes below the clamp voltage of the voltage clamp circuit 320, and the voltage clamp circuit deactivates. In response, transistor $Q_4$ activates. With the gate of transistor $Q_4$ coupled to its source via resistor R1 and no current flowing through transistor $Q_3$, transistor $Q_3$ also activates. The timing generator implements a pulse width of signal $PWM_2$. The falling edge of signal PWM2 causes the mode controller 358 to close switch $SW_2$. With the transistors $Q_3$ and $Q_4$ activated and switch $SW_2$ closed, comparator 262 again compares voltages $V_{SWC}$ and $V_{TH}$ so that the switching controller 350 can detect if ZVS has occurred within the dead time between the falling edge of the signal PWM2 and the rising edge of the signal PWM1 The foregoing process repeats.

In the example of FIG. 3, the drain of $Q_4$ is coupled to the switching terminal 258 so that the circuitry including transistors $Q_3$ and $Q_4$, the clamp circuit 320, the impedance device 330, and resistor $R_Z$ can function to power on the mode controller 358 during the startup mode and to provide zero-voltage switching of transistor $Q_1$. In some power converter applications (e.g., flyback converters implementing continuous conduction mode (CCM) and/or discontinuous conduction mode (DCM)), the startup function is needed but not the zero-voltage switching of transistor $Q_1$. In such applications, the drain of transistor $Q_4$ may be coupled to the input voltage terminal 101 instead of to the switching terminal 258.

The example of FIG. 3, the multiple control transistors 264 includes two, serially-coupled depletion-mode transistors $Q_3$ and $Q_4$ to operate as a voltage divider for higher levels of voltage $V_{IN}$ (e.g., 1000V). Some applications may have even higher levels of voltage $V_{IN}$ (1200V, 1500V, etc.). Accordingly, in some examples, the multiple control transistors 264 may include three (or more) depletion-mode transistors.

FIG. 4 is a schematic diagram of an illustrative switching controller 550 in which the multiple control transistors 264 includes three transistors—transistors $Q_3$ and $Q_4$ as described above and also transistor $Q_5$. Most of the switching controller 550 is largely the same as the switching controller 350 of FIG. 3, and reference can thus be made to the preceding description of switching controller 350. Transistors $Q_3$, $Q_4$, and $Q_5$ are depletion-mode transistors (e.g., NFETs). Transistor $Q_5$ is coupled between transistors $Q_3$ and $Q_4$.

The impedance device 330 (e.g., capacitor $C_{FF}$) is coupled between the drain and gate of transistor $Q_4$, as described above. Similarly, resistor $R_Z$ is coupled between the source and gate of transistor $Q_4$. Switching controller 550 includes a clamp circuit 520 which includes clamp terminals 521 and 522. Clamp terminal 521 is coupled to the gate of transistor $Q_4$, and clamp terminal 522 is coupled to the gate of transistor $Q_5$. The clamp circuit 520 includes serially-coupled Zener diodes $Z_{51}$, $Z_{52}$, $Z_{53}$, $Z_{54}$, $Z_{55}$, and $Z_{56}$. Although the clamp circuit 530 in the example of FIG. 4 includes six Zener diodes, the clamp circuit 520 may include fewer than six Zener diodes or more than six Zener diodes in other examples. The cathode of Zener diode Z+ is the clamp terminal 521, which is coupled to the gate of transistor $Q_4$. The cathode of Zener diode $Z_{54}$ is the clamp terminal 522, which is coupled to the gate of transistor $Q_5$.

The clamp voltage of the clamp circuit 520 is sum of the breakdown voltages of the series combination of the Zener diodes. In one example, the number of Zener diodes and their breakdown voltages are set such that the clamp voltage of the clamp circuit 520 is approximately equal to two-thirds of the maximum level of voltage $V_{SW}$. When voltage $V_{SW}$ is above the clamp voltage of the clamp circuit 520, the clamp circuit 520 activates and the voltage on the gate of transistor $Q_4$ is clamped at the clamp voltage, which is approximately two-thirds of the maximum level of voltage $V_{SW}$. In the example of FIG. 4, when the clamp circuit 520 activates, the voltage on the cathode of Zener diode $Z_{54}$ will be approximately one-half of the clamp voltage of the clamp circuit 520, and thus the voltage on the gate of transistor $Q_5$ will be approximately one-third of the clamp voltage. When the clamp circuit activates, the gate voltages of transistors $Q_4$ and $Q_5$ are fixed by the clamp circuit 520 and transistors $Q_4$ and $Q_5$ are in the deactivated state (OFF). As described above, the voltage regulator 356 fixes the voltage on the gate of transistor $Q_3$. Transistor $Q_3$ also will be in the deactivated state when the voltage $V_{SW}$ is large enough to activate the clamp circuit 520. With all three transistors $Q_3$, $Q_4$, and $Q_5$ deactivated, the series-combination of transistors $Q_3$-$Q_5$ operate as a voltage divider with approximately one-third of the voltage $V_{SW}$ divided across each of the transistors. For example, if voltage $V_{SW}$ is 1200V, the Vds of each of transistors $Q_3$-$Q_5$ will be approximately 400V. Accordingly, each transistor $Q_3$-$Q_5$ need not be sized to accommodate the entire voltage $V_{SW}$.

Figure 5:
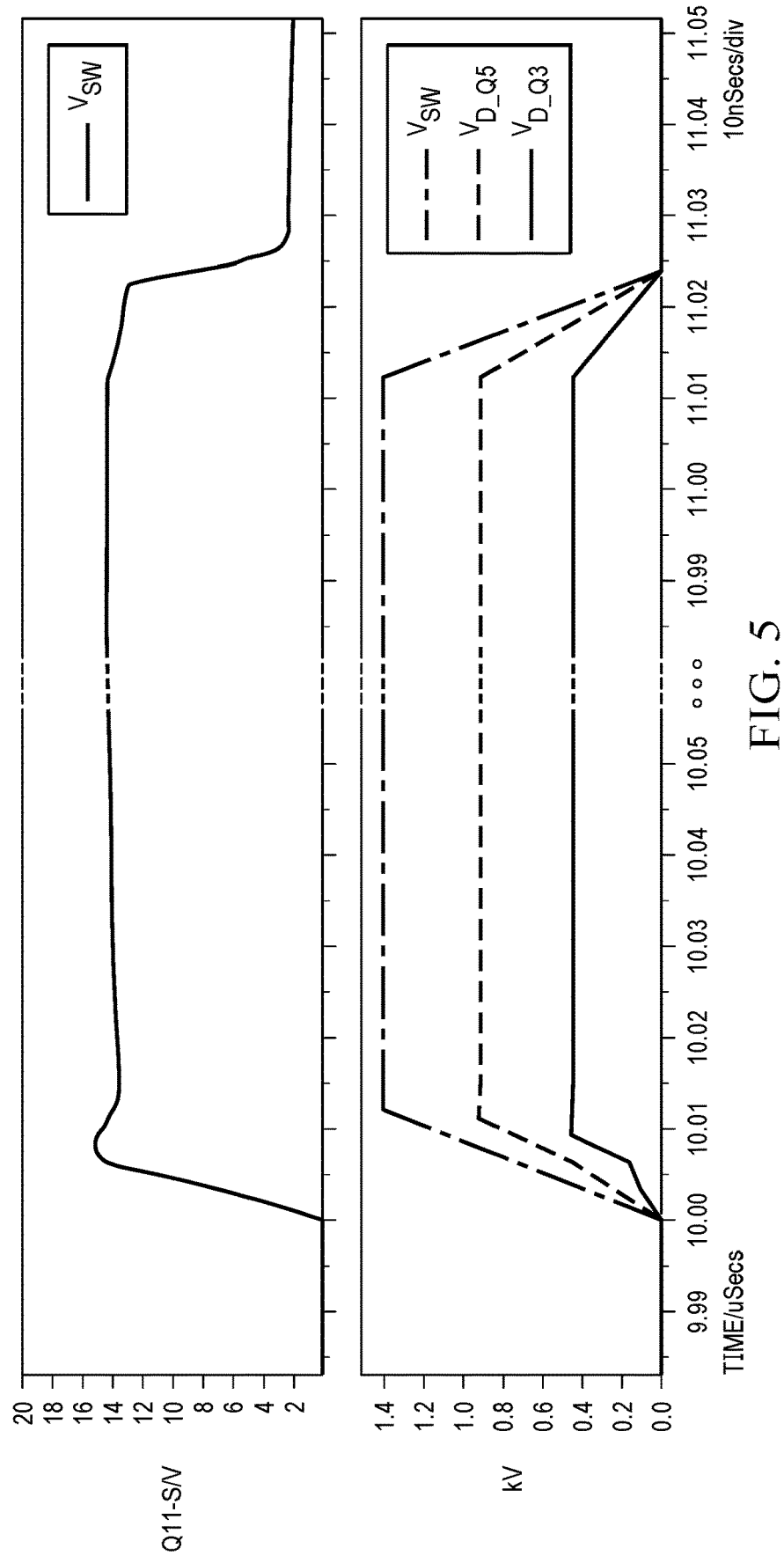
FIG. 5 is a graph illustrating various voltages within the switching controller of FIG. 4, in an example.

FIG. 5 is an example of a graph of the voltages $V_{SW}$, the voltage on the drain of transistor $Q_5$ ($V_{D\_Q5}$), and the voltage on the drain of transistor $Q_3$ ($V_{D\_Q3}$) with respect to time as the voltage $V_{SW}$ increases from approximately 0V to 1400V and back to 0V. When voltage $V_{SW}$ is at 1400V, the voltage on the drain of transistor $Q_5$ is approximately 933V, and the voltage on the drain of transistor $Q_3$ is approximately 466V. The Vds of each transistor $Q_3$-$Q_5$ is approximately one-third of the voltage $V_{SW}$ and thus substantially less than the voltage $V_{SW}$.

Figure 6:
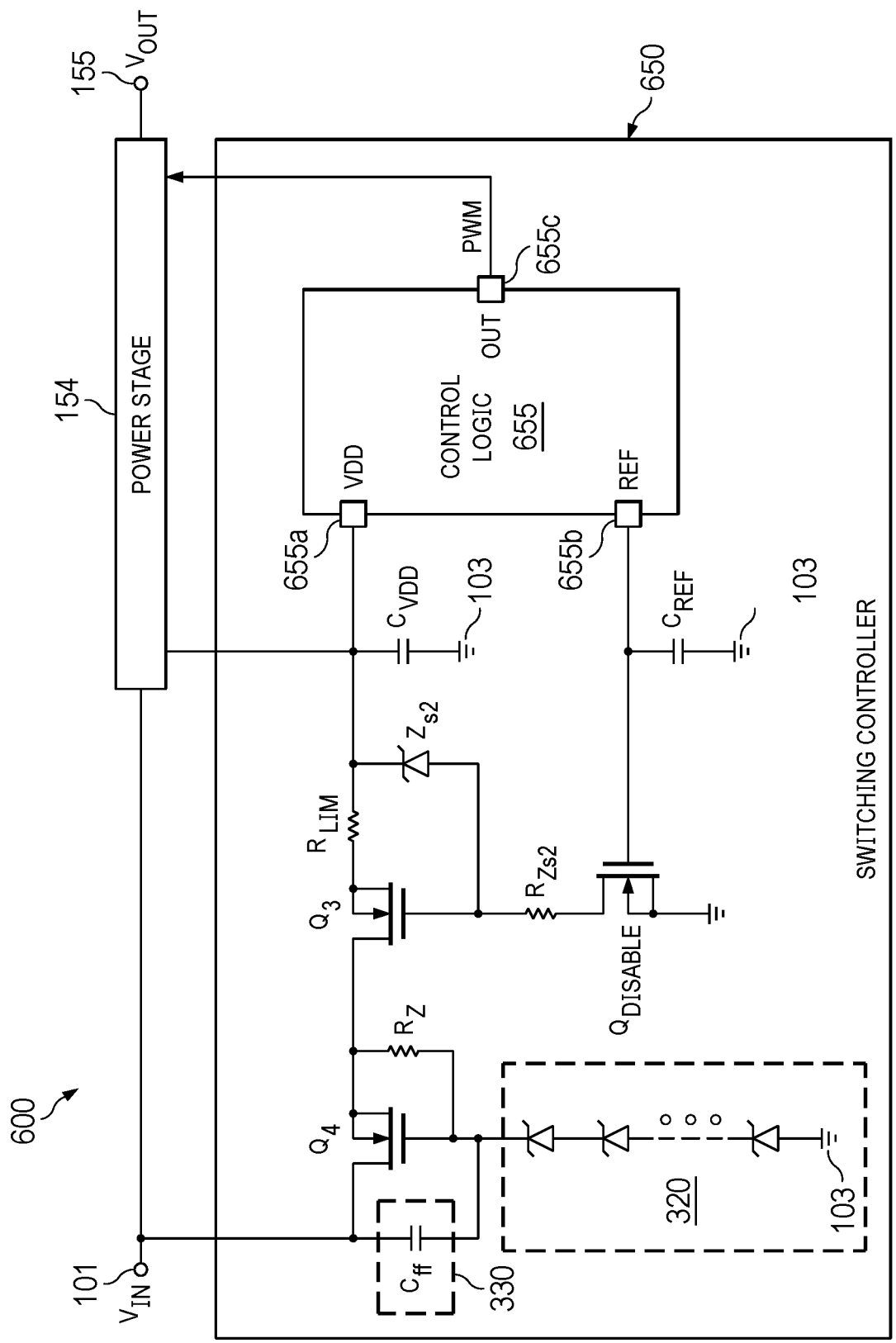
FIG. 6 is a schematic diagram of a switching controller that implements a startup function, but not a switching terminal sense function, in an example.

As described above, some flyback converters (e.g., flyback converters that implement continuous conduction mode (CCM) or discontinuous conduction mode (DCM)) do not need to perform ZVS of transistor $Q_1$, and thus only the startup functionality to bias on the switching converter is needed. FIG. 6 is a schematic diagram of an example power converter including a switching controller 650 coupled to power stage 154. The switching controller 650 includes control logic circuit 655, transistors $Q_3$ and $Q_4$ (e.g., depletion-mode NFETs as described above), transistor $Q_{DISABLE}$ (e.g., an NFET), clamp circuit 320, impedance device 330, resistors $R_Z$, $R_{LIM}$, and $R_{ZS2}$, Zener diode $Z_{S2}$, and capacitors $C_{VDD}$ (described above as part of the power stage) and $C_{REF}$.

The control logic circuit 655 includes terminals including a VDD terminal 655a, a voltage reference (REF) terminal 655b, and an output terminal 655c. Resistor $R_{LIM}$ is coupled between the source of transistor $Q_3$ and $V_{DD}$ terminal 655a. Capacitor $C_{VDD}$ is coupled between the VDD terminal 655a and the reference terminal 103. The REF terminal 655b is coupled to the gate of transistor $Q_{DISABLE}$. Capacitor $C_{REF}$ is coupled between the REF terminal 655b and the reference terminal 103. The output terminal 655c is coupled to the gate of the switching transistor within the power stage 154 (e.g., transistor $Q_1$, FIGS. 1 and 2). The control logic 655 may include switches, logic gates, flip-flops, comparators, etc. that is operative to generate a pulse width modulation signal PWM at its output terminal 655c as a control signal for the gate of transistor $Q_1$.

Transistors $Q_3$ and $Q_4$ are coupled in series between the input voltage terminal 101 and resistor $R_{LIM}$. As described above, the clamp circuit 320 is coupled between the gate of transistor $Q_4$ and the reference terminal 103, the impedance device 330 is coupled between the drain and gate of transistor $Q_4$, and resistor $R_Z$ is coupled between the source and gate of transistor $Q_4$. The clamp circuit 320, impedance device 330, and resistor $R_Z$ operate in much the same manner as described above to clamp the voltage on the gate of transistor $Q_4$ at levels of voltage $V_{IN}$ above the clamp voltage implemented by the clamp circuit 320. The control logic circuit 655 may include a voltage regulator to provide a reference voltage at its REF terminal 655b based on the voltage VDD at its $V_{DD}$ terminal 655a. The reference voltage at the REF terminal 655b is the gate voltage for transistor $Q_{DISABLE}$. Transistor $Q_{DISABLE}$ is deactivated when the reference voltage at the REF terminal 655b is logic low, which is the case when the voltage on the control logic's VDD terminal is below its UVLO level and is activated when the reference voltage at the REF terminal is logic high (VDD above UVLO). The control logic 655 causes transistor $Q_{DISABLE}$ to be activated during the startup mode and causes transistor $Q_{DISABLE}$ to be deactivated during the normal operating mode.

In the example of FIG. 6, the drain of transistor $Q_4$ is coupled to the input voltage terminal 101 instead of the switching terminal 258 (as was the case for the switching controller 350 and 550 of FIGS. 3 and 5, respectively). During the startup mode, VDD is below UVLO, and the voltage on the REF terminal 655b is 0V, which deactivates transistor $Q_{DISABLE}$. The diode drop across diode $Z_{S2}$ causes transistor $Q_3$ to be activates, and the voltage on the drain of transistor $Q_3$ is approximately equal to VDD (which is less than the UVLO voltage level). In this state ($Q_3$ activated, $Q_{DISABLE}$ deactivated, and voltage VDD less than UVLO), the transistor $Q_4$ also is activated because its gate voltage (which is increasing as VIN increases during startup) is higher than its source voltage.

Eventually VIN exceeds the UVLO voltage level at which time the control logic 655 enables an internal reference voltage circuit to set the voltage REF at a level high enough (e.g., 5V) to activate transistor $Q_{DISABLE}$. With transistor $Q_{DISABLE}$ activated, the gate voltage of transistor $Q_3$ is pulled lower than its source voltage, thereby deactivating transistor $Q_3$. With transistor $Q_3$ deactivated, the voltage on the source of transistor $Q_3$ and the drain of transistor $Q_4$ increases as VIN increases. When the source voltage of transistor $Q_4$ is above the gate voltage of transistor $Q_4$, transistor $Q_4$ deactivates. Also, when $V_{IN}$ reaches the clamp voltage of the clamp circuit 320, the clamp circuit 320 activates and fixes the gate voltage for transistor $Q_4$. With both transistors $Q_3$ and $Q_4$ in their deactivated state, the drain-to-source capacitances of transistors $Q_3$ and $Q_4$ function as a voltage divider dividing the input voltage $V_{IN}$ approximately evenly between transistors $Q_3$ and $Q_4$. Accordingly, neither transistor $Q_3$ nor transistor $Q_4$ need be sized to accommodate the full magnitude of the input voltage $V_{IN}$.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, the recitation "based on" means "based at least in part on." Therefore, if X is based on Y, then X may be a function of Y and any number of other factors.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead with little or no change to the remaining circuitry. For example, a field effect transistor ("FET") (such as an n-channel FET (NFET) or a p-channel FET (PFET)), a bipolar junction transistor (BJT—e.g., NPN transistor or PNP transistor), an insulated gate bipolar transistor (IGBT), and/or a junction field effect transistor (JFET) may be used in place of or in conjunction with one or more of the devices described herein. The transistors may be depletion mode devices, drain-extended devices, enhancement mode devices, natural transistors or other types of device structure transistors. Furthermore, the devices may be implemented in/over a silicon substrate (Si), a silicon carbide substrate (SiC), a gallium nitride substrate (GaN) or a gallium arsenide substrate (GaAs).

References may be made in the claims to a transistor's control input and its current terminals. In the context of a FET, the control input is the gate, and the current terminals are the drain and source. In the context of a BJT, the control input is the base, and the current terminals are the collector and emitter.

References herein to a transistor being "activated" or "ON" means that the conduction channel of the transistor is present and drain current may flow through the transistor. References herein to a transistor being "deactivated or "OFF" means that the conduction channel is not present so drain current does not flow through the transistor. A "deactivated" transistor, however, may have current flowing through the transistor's body-diode.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter or, if the parameter is zero, a reasonable range of values around zero.

Modifications are possible in the described embodiments, and other embodiments are possible, within the scope of the claims.

What is claimed is:

1. A power converter, comprising:
a power stage having an output configured to provide a primary current through a primary winding of a transformer in response to a pulse-width modulation (PWM) signal and to induce a secondary current in a secondary winding of the transformer to generate an output voltage, the power stage having a switching terminal between a power switch and the primary winding; and
a switching controller including:
a first control transistor coupled in series with a second control transistor to initiate an operational voltage during a startup mode of the power converter and to provide a control voltage based on an amplitude of a switching voltage at the switching terminal during a switching mode, the first control transistor having a first control input;
a clamp circuit coupled between the first control input and a reference terminal, the clamp circuit configured to clamp a voltage at the first control input responsive to the switching voltage exceeding a clamp voltage of the clamp circuit;
a comparator having a first input coupled to the second control transistor, a second input coupled a voltage source circuit, and an output;
a timing generator having an input and an output, wherein the input of the timing generator is coupled to the output of the comparator, and the output of the timing generator is an output of the switching controller; and
an impedance device coupled between the switching terminal and the clamp circuit.

2. The power converter of claim 1, wherein the clamp circuit includes multiple Zener diodes coupled in series between the first control input and the reference terminal.

3. The power converter of claim 1, wherein the impedance device includes a capacitor.

4. The power converter of claim 1, wherein the first control transistor is coupled to the second control transistor at a transistor terminal, and the power converter further includes a resistor coupled between the transistor terminal and the clamp circuit.

5. The power converter of claim 1, wherein the first control transistor and the second control transistor are depletion-mode transistors.

6. The power converter of claim 1, further comprising a third control transistor coupled between the first and second control transistors, the third control transistor having a second control input, and the clamp circuit is coupled to the second control input, the clamp circuit configured to clamp a voltage at the second control input responsive to the switching voltage exceeding a clamp voltage of the clamp circuit.

7. The power converter of claim 6, wherein the first, second, and third control transistors are depletion-mode transistors.

8. A power converter, comprising:
a power stage having a switching terminal; and
a switching controller coupled to the switching terminal, the switching controller including:
a comparator having a first input and a second input;
a first depletion-mode transistor having a first current terminal and a second current terminal, the second current terminal coupled to the first input;
a second depletion-mode transistor coupled between the switching terminal and the first current terminal, the second depletion-mode transistor having a control input;
a clamp circuit having a clamp terminal coupled to the control input; and
an impedance device coupled between the switching terminal and the clamp terminal.

9. The power converter of claim 8, wherein the clamp circuit includes multiple Zener diodes coupled in series between the first current terminal and a reference terminal.

10. The power converter of claim 8, wherein the impedance device includes a capacitor.

11. The power converter of claim 8, wherein the first depletion-mode transistor is coupled to the second depletion-mode transistor at a transistor terminal, and the power converter further includes a resistor coupled between the first current terminal and the clamp terminal.

12. The power converter of claim 8, further comprising a reference voltage circuit coupled to the second input.

13. A circuit, comprising:
a first depletion-mode transistor having a first control terminal and first and second current terminals;
a second depletion-mode transistor having a second control terminal and third and fourth current terminals, the fourth current terminal coupled to the first current terminal;
a clamp circuit having a clamp terminal coupled to the second control terminal;
a comparator having a first input coupled to the second depletion-mode transistor, a second input coupled a voltage source circuit, and an output;
a timing generator having an input coupled to the output of the comparator; and
an impedance device coupled between the third current terminal and the clamp terminal.

14. The circuit of claim 13, further comprising a third depletion-mode transistor having a third control terminal, the third depletion-mode transistor coupled between the first and second depletion-mode transistors.

15. The circuit of claim 14, wherein the clamp terminal is a first clamp terminal, and the clamp circuit has a second clamp terminal coupled to the third control terminal.

16. The circuit of claim 15, wherein the clamp circuit comprises multiple Zener diodes coupled in series between the second control terminal and a reference terminal, and the first clamp terminal is coupled to a cathode of one of the multiple Zener diodes, and the second clamp terminal is coupled to a cathode of another one of the multiple Zener diodes.

17. The circuit of claim 13, wherein the clamp circuit comprises multiple Zener diodes coupled in series between the second control terminal and a reference terminal.

18. The circuit of claim 13, wherein the impedance device includes a capacitor.

19. The circuit of claim 13, further comprising a resistor coupled between the fourth current terminal and the clamp terminal.

20. The circuit of claim 13, further comprising:
a first resistor coupled to the first control terminal;
a third transistor having a third control terminal, the third transistor coupled between the first resistor and a reference terminal;

a Zener diode having an anode and a cathode, the anode coupled to the first control terminal; and a second resistor coupled between the second current terminal and the cathode.

\* \* \* \* \*